United States Patent [19]

Clausen et al.

[11] E Re. 28,627

[45] **Reissued*Nov. 25, 1975**

[54] WOOD VENEER AND JOINING AND HANDLING APPARATUS

[75] Inventors: Victor H. Clausen, Bellevue; Arnold Zweig, Olympia, both of Wash.

[73] Assignee: Stetson Ross, Inc., Seattle, Wash.

[ * ] Notice: The portion of the term of this patent subsequent to Apr. 9, 1985, has been disclaimed.

[22] Filed: July 29, 1970

[21] Appl. No.: 59,199

Related U.S. Patent Documents

Reissue of:

[64] Patent No.: 3,445,313
Issued: May 20, 1969
Appl. No.: 481,839
Filed: Aug. 23, 1965

U.S. Applications:

[63] Continuation-in-part of Ser. No. 331,893, Dec. 19, 1963, Pat. No. 3,377,223.

[52] U.S. Cl. ..... 156/433; 144/315; 156/498; 156/499; 156/544

[51] Int. Cl. ..... B27d 1/00; B29b 5/06

[58] Field of Search ..... 156/433, 436, 498, 499, 156/544, 583, 311, 166, 176, 178

[56] References Cited

UNITED STATES PATENTS

| | | | |
|---|---|---|---|
| 1,977,199 | 10/1934 | Osgood | 144/309 |
| 2,428,325 | 9/1947 | Collins | 161/143 |
| 2,500,053 | 3/1950 | Andrews | 156/176 |
| 2,640,796 | 6/1953 | Langer | 156/176 |
| 3,123,354 | 4/1964 | Unberer | 271/74 |
| 3,135,644 | 6/1964 | Coplen et al. | 161/101 |
| 3,159,526 | 12/1964 | Van Hartesveldt et al. | 161/261 |
| 3,185,614 | 5/1965 | Van Hartesveldt et al. | 161/261 |
| 3,272,351 | 9/1966 | Burton et al. | 214/6 |
| 3,326,736 | 6/1967 | Ortel | 156/297 |

*Primary Examiner*—Daniel J. Fritsch
*Attorney, Agent, or Firm*—Dowrey & Cross

[57] ABSTRACT

A system for forming composite wood veneer sheets from a plurality of random width veneer pieces. The pieces are tenderized by shallow knife cuts, and passed in abutting relationship through a crowder conveyor. While the veneer pieces are crowded, a continuous strand of substantially untwisted fiber glass is applied to the adjacent face surfaces of the veneer pieces with a thermoplastic adhesive. The fibrous strand is pressed onto the surface of the veneer pieces by means of a pressure foot which also includes a heated toe portion and a cool heel portion to insure setting of the adhesive. The continuous ribbon is then edge-trimmed and clipped into proper dimensions for core veneer and stacked by vacuum apparatus.

10 Claims, 7 Drawing Figures

WOOD VENEER AND JOINING AND HANDLING APPARATUS

Matter enclosed in heavy brackets [ ] appears in the original patent but forms no part of this reissue specification; matter printed in italics indicates the additions made by reissue.

This is a continuation-in-part of our co-pending patent application Ser. No. 331,893 filed Dec. 19, 1963 now Pat. No. 3,377,223.

The present invention relates in general to the formation and handling of wood veneers and more particularly to an improved system and apparatus for treating and joining relatively narrow random width veneers to form a composite veneer, followed by trimming, cutting and stacking the veneer for use in industries such as plywood making.

The present invention presents an improved system and apparatus for joining narrow width veneer pieces which result from natural splitting of the veneer ribbon during handling and the trimming of veneer pieces to eliminate defects such as pitch pockets, knots, checks, cracks etc. which are unacceptable. The present invention seeks to eliminate the tedious and expensive individual handling of such veneer pieces and to provide a means for joining such pieces with the elimination of edge gluing or seam taping, which methods have proven unsatisfactory in most industries and especially in the plywood industry. The present system provides for a continuous flow of veneer pieces during treatment, which includes; tenderizing to improve the handling quality of the veneer, moving the veneer into tight edge-to-edge relationship and holding the veneer in this position while applying strands of untwisted fiber glass or the like to the surface of the veneer, cutting and trimming the veneer to the desired dimensions, and finally forming a stack of the cut veneer sheets as they are fed from the system.

Accordingly, the primary object of the present invention is to provide a continuous system for fabricating composite veneer sheets of usable dimensions from individual narrow random width rough veneer pieces and forming such sheets into stacks for further use.

Another object of the present invention is to provide improved apparatus for joining the veneer pieces in edge-to-edge abutment by the bonding of continuous high tensile strength untwisted strands to the surface thereof.

A further object of the present invention is to provide an improved mechanism for automatically receiving and stacking the composite veneer sheets as they are formed.

The means by which the foregoing objects and other advantages, which will be apparent to those skilled in the art are accomplished, are set forth in the following specification and claims and are illustrated in the accompanying drawings dealing with a preferred embodiment of the system and apparatus.

Reference is now made to the accompanying drawings in which.

Figure 1:
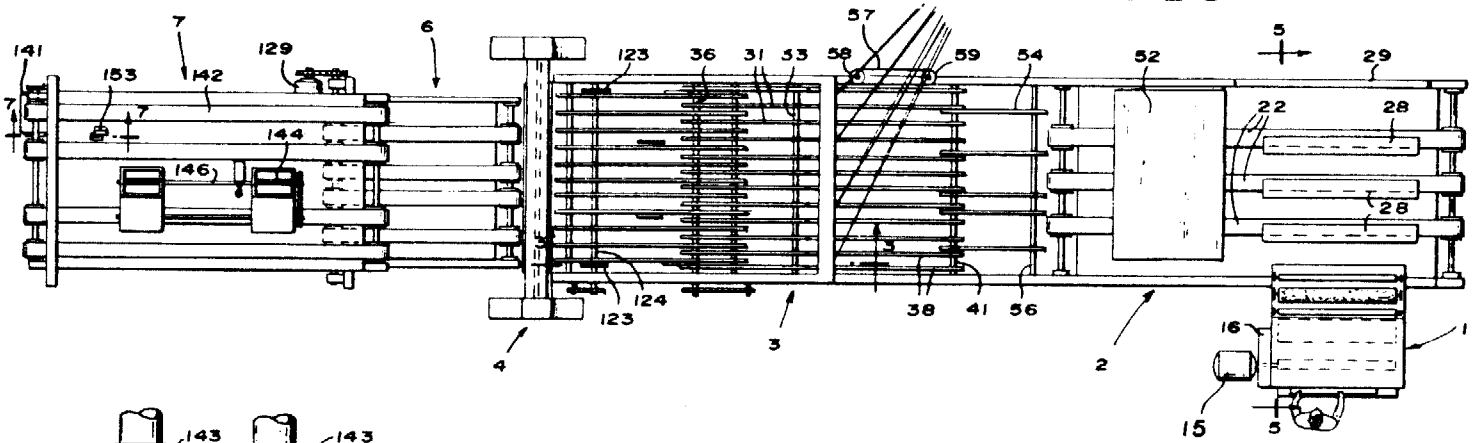
FIG. 1 is a [plane] *plan* view of the overall system and apparatus.
Figure 2:
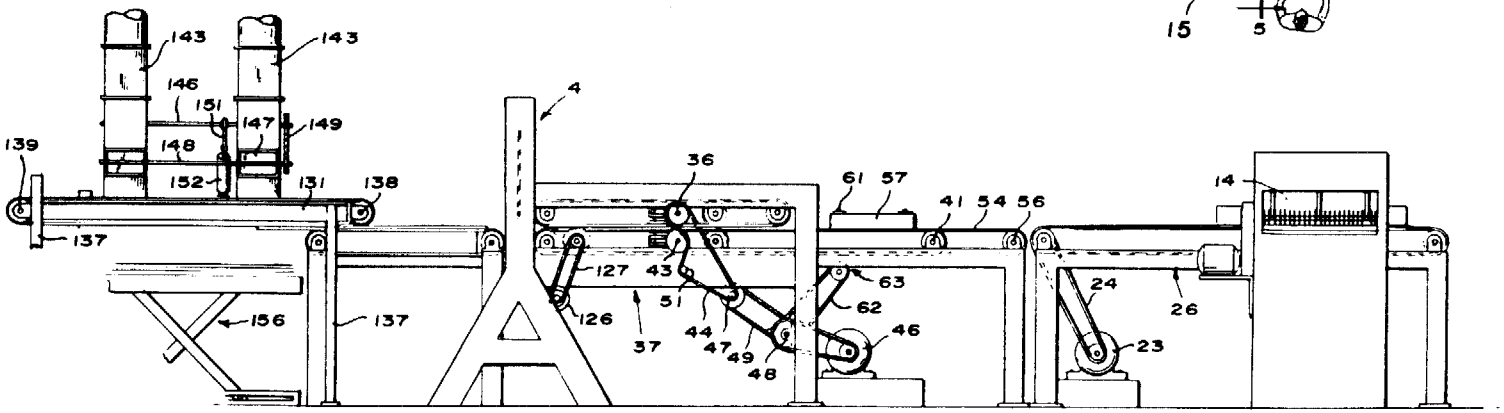
FIG. 2 is a side elevational view of the system.

Referring now to the drawings wherein like reference numerals indicate identical parts in the various views, the overall system illustrated in FIGS. 1 and 2 includes; a veneer tenderizer 1, an infeed conveyor 2, a crowder and strand applying unit 3, a cutter 4, outfeed conveyor 6 and the receiving and stacking unit 7.

Although the primary concern in the present invention is the handling of narrow width veneer pieces, it will be understood that the system may also be utilized in handling regular or extra wide veneer pieces since the object is to form a continuous composite sheet of veneer and to then cut it to the dimensions desired. In any event, the veneer pieces in random width will be clipped with straight side edges for abutting and joining by the present system and apparatus before being subjected to treatment.

As is well known to those experienced in handling veneer from a peeler log, the sheet of veneer will not usually lie flat but will tend to curl upward along its side edges and to be rather wavey along its width since it is peeled from the curved surface of the log. In order to facilitate the present joining process and to improve the ability of the finished veneer sheets to lie flat, the veneer pieces are initially manually fed through the tenderizer unit 1 as a first step in the continuous system. Tenderizing the veneer pieces in the manner to be described promotes a better bond between the fiber glass strands during the joining of the pieces and permits the finished composite veneer sheets to be coated with an adhesive by means of curtain coating which requires a relatively flat surface in order to obtain adequate spreading of the adhesive and to avoid shadows. The tenderizer unit 1 may be any conventional unit well known to the prior art and normally includes upper and lower spaced drum rollers 8 and 9 respectively which act as backup members for the circular knife units 11 and 12 respectively. The rollers and knife units are shaft mounted on appropriate bearings within the housing 13 which is provided with an infeed opening 14 through which the veneer pieces may be fed. The roll and knife shafts may be driven by a motor 15 through appropriate drive chains or belts within the housing 16. As is conventional in the art, each of the knife units 11 and 12 comprises a plurality of shaft mounted perforating disc knives. The knives cooperate with the backup rolls to inflict a multitude of spaced staggered knife cuts or perforations on both surfaces of the veneer pieces in the direction of the grain of the veneer. The knife cuts are shallow and short in length so as not to overly weaken the veneer. This treatment, of course, causes the veneer piece to become substantially more limp so as to lie flat on the surface. The veneer pieces are supported while moving through the tenderizer by the sections of the support table 17. The tenderizer is also provided with pairs of spring biased rollers 18 and 19 which serve to hold the veneer piece flat while passing through the tenderizer. In addition, a counter rotating brush 21 is mounted between the rollers and may be driven through any suitable drive connection with the rotating roller and knife units. The brush 21 serves to clean any wood scraps or pieces from the top surface of the veneer as it passes out of the tenderizer and on to the infeed conveyor of the system.

Figure 5:
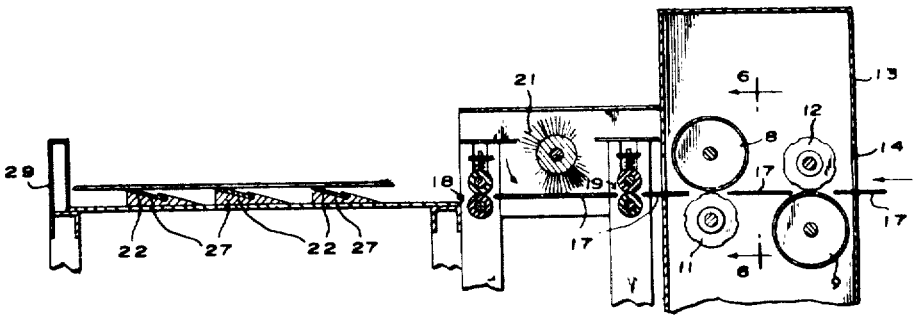
FIG. 5 is a cross sectional view taken along the lines 5—5 of FIG. 1.
Figure 6:
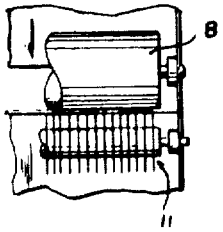
FIG. 6 is an elevational detail taken along lines 6—6 of FIG. 5.

The infeed conveyor 2 may comprise a plurality of conveyor belts 22 which form the infeed conveying means for the crowder and strand applying unit 3. As shown in FIG. 2, the belts 22 are driven by a motor 23 with a chain or belt drive 24. The conveyor belts 22 may be supported by any support framing such as that shown at 26. The direction of movement of the belts is at right angles to the movement of the veneer pieces through the tenderizer. As illustrated in FIG. 5, the belts are held in a transverse inclined position at the outlet end of the tenderizer by means of the support blocks or rails 27 in order to prevent the transversely moving veneer pieces from hanging up on the edges of the belts. In addition, cover plates 28 overlie the edge of each belt on the tenderizer side of the conveyor to protect the edges of the moving belts. A guide rail 29 extends over a portion of the length of the infeed conveyor 2 opposite the tenderizer and provides a stop for the transversely moving veneer.

The crowder portion of the unit 3 is a conventional piece of equipment in the wood veneer industry which functions to move individual veneer pieces into tight edge-to-edge abutment and to maintain them in this condition until some joining operation can be accomplished. The crowder shown by way of illustration in the drawings is an endless chain crowder which comrises laterally spaced endless top chains 31 trained about a first row of spaced sprockets 32 carried on a transverse shaft 33, and a second set of sprockets 34 spaced along a transverse shaft 36. The transverse shafts 33 and 36, and other structures to be described for the crowder device, may be supported by any suitable framing structure indicated generally at 37.

Figure 3:
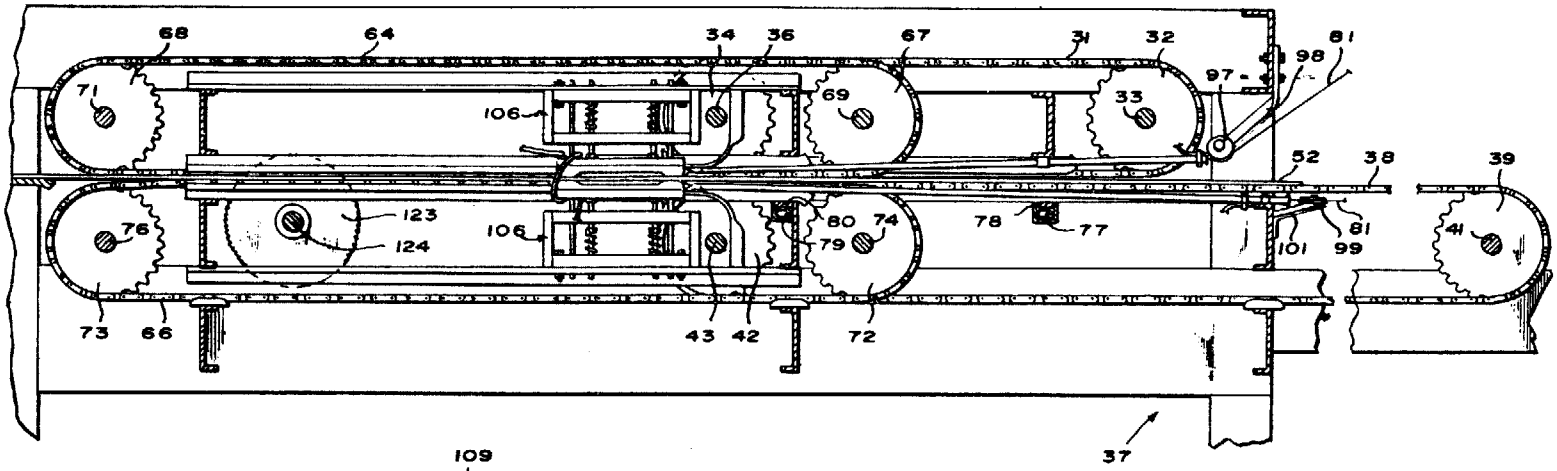
FIG. 3 is a cross sectional view taken along lines 3—3 of FIG. 1.

A similar set of spaced endless chains 38 is located directly beneath and in vertical alignment with the endless chains 31. The chains 38 are trained about a first set of sprockets 39, mounted on shaft 41, and a second set of sprockets 42, mounted on transverse shaft 43. The top chains 31 and the bottom chains 38 may be driven conjointly by means of a suitable drive chain 44 which is in turn driven by the motor 46 through the idler shafts 47 and 48, intermediate drive chains 49 and associated sprockets illustrated in FIG. 2. The chain 44 passes about an idler sprocket 51 on the machine frame and engages a sprocket on the transverse shaft 43 to drive the shaft and the chain 38 in the counter clockwise direction as viewed in FIGS. 2 and 3, and then about a sprocket on the shaft 36 to drive the shaft in the clockwise direction. As shown in FIG. 3, the chains 31 and 38 are spaced a slight distance apart to allow them to engage and convey individual pieces of wood veneer 52 therebetween. In practice, the distance between the upper and lower sets of chains is adjustable and means will be provided to maintain a slight bit of pressure on the chains and the surfaces of the veneer pieces.

The veneer pieces 52 are transferred from the infeed conveyor 2 to the chains 38 by means of a plurality of transfer belts 54 trained about suitable pulleys on the shaft 41 and on an idler shaft 56. In addition to the transfer belts 54, a vertically disposed endless guide belt 57 is positioned on one side of the lower chains 38 and is driven at the same speed as the chains. The belt 57 may be trained about suitable vertical rollers 58 and 59 with the roller 58 being mounted on a drive shaft 61 which is driven by means of a belt or chain 62 through the right angle drive unit 63. The guide belt 57 serves to insure that one edge of the veneer piece 52 is aligned therewith so as to properly position the veneer before it passes between the chains 31 and 38.

The crowding or pressuring of the veneer pieces into tight edge-to-edge contact is accomplished by means of a third set of upper chains 64 and a fourth set of lower chains 66 which overlap the ends of the chains 33 and 38 as shown clearly in FIG. 3. The top chains 64 are trained about first and second sets of sprockets 67 and 68, fixed to the transverse shafts 69 and 71 respectively. The shafts 69 and 71 may be journaled by any suitable means within the overall frame structure 37.

The bottom chains 66 are trained about sprockets 72 and 73 fixed to transverse shafts 74 and 76 respectively with the shafts 74 and 76 being likewise journaled to the frame 37. The sets of chains 64 and 66 are driven in the same relative direction as the chains 31 and 38 respectively by the veneer pieces 52 therebetween as they are forced by the chains 31 and 38. The chains 64 and 66 will also be adjustably pressured against the veneer pieces 52 in order to hold them flat. The crowding of the veneer pieces is accomplished by the driving action of the chains 31 and 38 and the retarding action of the chains 64 and 66. Thus the veneer pieces are tightly abutted and maintained in this position while they are between the chains 64 and 66.

As illustrated in FIG. 3, the top runs of chains 38 may be forced upwardly by means of pneumatic pressure hose 77 which is expanded against the transverse pressure bar 78 acting on the chain guides. Likewise, the upper runs of chains 66 may be urged upwardly by means of pneumatic hose 79 expanded against transverse pressure bar 80 acting on the chain guides. The means for adjustably applying pressure to the crowder chains is shown by way of example only and it will be appreciated that any equivalent means known to the prior art may be utilized without departing from teh concepts of the invention.

According to the present invention, means are provided in combination with the crowder structure described for bonding strands of high tensile strength material at a plurality of positions on both the upper and lower faces of the veneer pieces 52 passing through the crowder device. For the purpose of this invention, the term "strand" is used in its broad sense as meaning a thread-like construction composed of a plurality of filaments or fibers or a plurality of thread-like units made up of multiple ends or filaments. In its broadest sense, the invention contemplates the use of any material in strand form, as defined, which exhibits a relatively high degree of tensile strength, in strand form, and is capable of being pressed or flattened on a wood veneer surface for a purpose to be described. In practice is has been found that strands of material which can be characterized as substantially "untwisted," i.e. strands of "bunched" or "grouped" threads or filaments best meet these requirements.

One type of material which has been utilized to accomplish the objects of the present invention comprises a substantially untwisted continuous strand of fiber glass, made up of twelve "ends" or units of filaments with each unit containing 204 filaments. Fiber glass strands suitable for use in the present invention are commercially available and the preferred fiber glass strand described would be termed in the art as "12 end continuous roving." The use of fiber glass strands is preferred in accomplishing the objects of the present invention because of the low cost of the material and the high tensile strength exhibited by the single strand in an untwisted condition. Since the fiber glass strands are substantially untwisted, the material of a strand may be flattened out on the surface of the wood veneers thus offering very little interference with the glue line of a plywood panel or any other material laminated to the surface of the veneer pieces. Although twisted fiber glass strands may be used in connection with the present invention, the advantages gained by flattening the strands, as described in the preferred embodiment, will not be wholly obtained.

Figure 4:
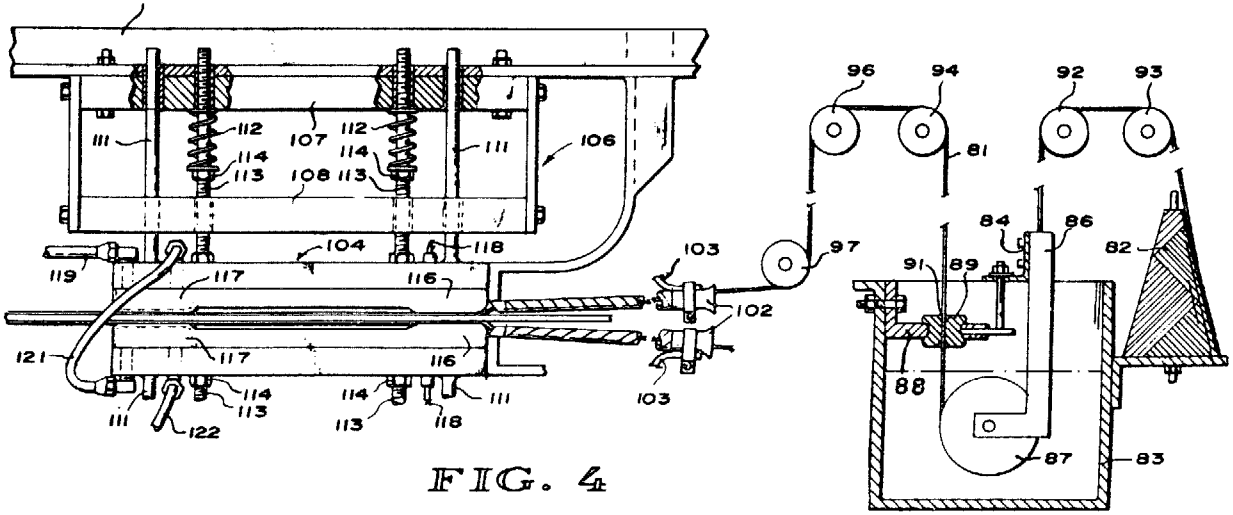
FIG. 4 is a partially sectioned elevational detail of the strand applying mechanism and feed.

Since fiber glass is the preferred material, the following description will be made with reference to fiber glass strands. As illustrated in FIGS. 1 and 3, individual strands of fiber glass 81 are supplied to the crowder device with four such strands being pulled in on the top surface of the veneer pieces and four identical strands being pulled in and applied to the bottom surface. The supply of fiber glass strands may be maintained remote from the rest of the apparatus at any desired location, either wall mounted or otherwise supported. Since the supply source and apparatus for each individual strand is identical, only one such supply source is shown schematically in FIG. 4 and it will be understood that this arrangement is repeated for all eight strands utilized. Referring to FIG. 4, each of the strands 81 may be supplied from a spool 82 rotatably mounted on a post or shaft as illustrated. The spools 82 are mounted adjacent a tank or vat 83 which is designed to carry a supply of thermoplastic or hot melt adhesive which may be any one of a wide variety of synthetic resins or other thermoplastic adhesives suitable for forming a strong bond between the fiber glass and a wood surface. It will be necessary to maintain the thermoplastic adhesive in the tank 83 in the liquid state for the purpose of saturating the fiber glass strand in a manner to be described and any well known form of the heating arrangement for the tank (not shown) may be utilized.

Referring to FIG. 4, the tank 83 includes a first angle iron brace 84 for supporting a strand guide member 86 for each of the spools 82 with the guide members 86 also including a pulley 87 rotatably attached to its lower end. In addition, the tank 83 includes a transverse angle bracket 88 for mounting a plurality of grommets or eyelets 89 in alignment with the pulleys 87. The grommets 89 may be constructed from Teflon or the like and are formed with an orifice 91 through which the fiber glass strand passes after it leaves the thermoplastic adhesive. The Teflon grommets 89 function as wiping orifices for the saturated fiber glass strands. In order to guide the strands from the spool 82 to the thermoplastic adhesive, each strand will be provided with pulleys 92 and 93. Each of the eight fiber glass strands travels upwardly from its spool and then downwardly into the adhesive bath, around the pulley 87 and then upwardly through wiping orifice 91 and about suitable guide pulleys 94 and 96 to be directed to the point of application to the wood veneer surface. As seen most clearly in FIG. 3, each of the fiber glass strands 81 to be applied to the top surface of the veneer pieces passes over a suitable guide pulley 97 mounted on a depending bracket 98 attached to the machine frame. The fiber glass strands for the bottom surface of the veneer pieces pass over similar pulleys 99 carried by upstanding brackets 101 also fixed to the machine frame. It will be noted that the thermoplastic adhesive on each fiber glass strand quickly dries after the strand leaves the Teflon wiping orifice. The diameter of the orifice 91 determines the amount of adhesive metered onto the fiber glass strand and interchangeable Teflon grommets with various diameter orifices may be used. Although the present illustrated embodiment utilizes four fiber glass strands on the top surface and four strands on the bottom surface of the veneer pieces, the exact placement of fiber glass strands and the exact number of strands used may be varied within the scope of the present invention depending upon the use for which the composite wood veneer is intended. The mechanical means for applying each individual strand is identical and hence only one such means will be described with reference to FIGS. 3 and 4 of the drawings.

Referring to FIG. 4 in detail, strand 81, saturated with dried thermoplastic adhesive, passes through a tubular conduit 102 which is heated by electrical resistance by means of the lead wires 103 connected to the tubes. As the saturated strand passes through the heated tube 102, the thermoplastic adhesive is melted to a flowable state so that the strand issuing from the tube 102 is ready to be applied and bonded to the surface of the veneer piece. It will also be noted that the tube 102 is wrapped with asbestos to prevent loss of heat from the tube. As the strand passes out of the tube 102, it passes beneath a spring loaded shoe 104 mounted on a frame structure 106 which includes the upper and lower guide bars 107 and 108 fixedly attached to a longitudinal beam 109 which is a part of the machine frame. The shoe 104 includes upstanding guide rods 111 which pass through suitable bores in the upper and lower guide bars 107 and 108. The shoe 104 is spring pressed downwardly by means of the coil springs 112 which bias the pressure rods 113 against the top surface of the shoe. The spring pressure may be adjusted by means of the screw threaded stop members 114.

The shoe structure 104 includes a heated toe portion 116 adjacent the outlet end of the heated tubes 102 as illustrated in FIG. 4 and a cooling chamber 117 at the opposite heel end thereof. The toe portion 116 of the shoe is equipped with an electrical resistance heat unit energized by the electrical leads 118 with the portion 116 having a heated contact surface for applying pressure and heat to the adhesive saturated fiber glass strand on the surface of the moving veneer pieces. The cooling chamber 117 is formed internally in the body of the shoe 104 at the end thereof opposite the heated portion 116 and is adapted to receive a quantity of cold tap water which is introduced into the chamber through the water conduit 119. The cooling water is caused to flow continuously from the supply conduit 119, through the chamber 117 and to an identical cooling chamber 117 in the pressure shoe directly beneath the veneer by means of the connecting conduit 121. The lower cooling chamber may be connected to a drain by the conduit 122. Thus the cooling chambers 117 of the shoes above and below the moving veneer are constantly supplied with a cooling medium so as to insure setting of the adhesive in the fiber glass strand after it is pressed against the veneer surfaces. It will be understood that the entire shoe structure and strand applying device beneath the veneer pieces is identical in structure and opeation with that above the veneer.

With the described shoe structure, the strands 81 are flattened and spread out over the veneer surface to greatly reduce their thickness. The heated portion 116 of the shoe 104 insures bonding of the fiber glass strand to the veneer surfaces by heat and pressure and the cooling effect of the chamber 117 of the shoes causes complete setting of the thermoplastic adhesive so as to permanently bond the fiber glass strands to the wood veneer surfaces by the time the strand emerges from beneath the shoe. As also seen from FIG. 3, the application of the fiber glass strand is accomplished at a position along the crowder device where the veneer pieces 52 have been tightly pressured together to avoid any gaps. It will also be noted that the feeding of the fiber glass strands 81 is automatically provided by the fact that the strands are bonded to the surfaces of the veneer pieces as they move, thus pulling the strands 81 at the same rate of travel.

As the continuous composite sheet of joined veneer pieces issues from the crowder and strand applying unit 3, trimming saws 123 mounted on each side of the chains 64–66 are used to trim each edge of the sheet. The saws 123 may be mounted on a common shaft 124 so as to be driven by a single motor unit 126 through a drive belt 127. The saws are preferably located approximately one-quarter of an inch from the outside of each end strand in the case of veneers intended for plywood panel manufacture since final trimming of the finished panel would result in the removal of the fiber glass strands along the edges of the veneers thus eliminating all possibility of interference with the glue lines of the panel edges.

After the composite veneer has been edge trimmed by the saws 123, a conventional clipper or cutter 4 is used to cut the veneer into sheets. The operation of the blade of the cutter will be synchronized with the speed of the crowder conveyor to cut the endless ribbon of joined veneer pieces into the desired width for plywood production or for any other use desired. The outfeed conveyor 6 which may be any conventional belt conveyor driven by the motor 129 feeds the cut veneer sheets to the receiving and stacking unit 7.

Figure 7:
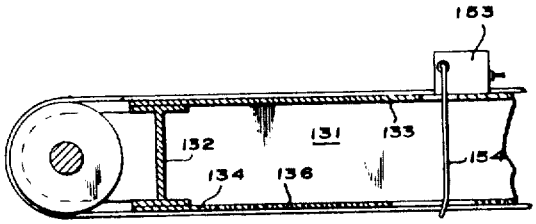
FIG. 7 is a cross sectional view taken along lines 7—7 of FIG. 1.

The details of the stacker unit are shown most clearly in FIGS. 1, 2 and 7. The unit comprises a rectangular vacuum chamber formed by the side channels 131 and end channels 132 which are assembled to form a rectangular frame. A sheet metal wall 133 is welded or otherwise connected to the side and end frames to form the top wall of the chamber and a second sheet metal member 134 forms the bottom wall of the chamber. As shown in FIG. 7, the bottom wall 134 is provided with closely spaced perforations 136 for a purpose to be described. The entire chamber may be supported by the uprights 137 in a fixed position above the terminal end of the conveyor 6 so as to overlap the end portion thereof. Each of the side frames 131 includes an extension providing journal mountings for the transverse shafts 138 and 139 with the shaft 139 being driven by an electric motor 141 as illustrated in FIG. 1. A plurality of endless belts 142 are trained about suitable rollers on the shafts 138 and 139 with the upper run of the belts passing across the top surface of the wall 133 of the chamber and the lower runs of the belts passing over the perforated surface of the bottom wall 134.

Vacuum pressure is applied to the chamber by means of the vacuum conduits 143 which are directly connected to a suitable source of vacuum pressure. Each of the conduits 143 includes a shut-off valve 144 operated by a common shaft 146 and a release valve 147 operated by the common shaft 148. The valves 144 and 147 are so positioned on the respective operating shafts so that the valve 144 is in the open position shown in FIG. 1 when the valve 147 is in the closed position and vice versa. The shafts 146 and 148 are connected to be rotated simultaneously by means of the chain 149 passing about suitable sprockets on the shafts. The shaft 146 is rotated by means of a crank arm 151 which is operated by an air cylinder 152. To complete the structure of the unit 7, a contact switch 153 is mounted thereon and includes a switch arm 154 which extends a slight distance below the bottom surface of the perforated wall 134 as shown in FIG. 7 for a purpose which will presently be described. A stack supporting table indicated generally at 156 is located directly beneath the unit 7 so as to receive the composite veneer sheets as they are dropped vertically.

The air cylinder 152 will normally be positioned by the operation of a control valve (not shown) so as to maintain the shut-off valve 144 in the open position and the relief valve 147 in the closed position to apply vacuum pressure to the chamber. With the conveyor belts 142 moving in the clockwise direction, a sheet veneer issuing from the conveyor 6 will be held against the bottom run of the belts 142 by virtue of the lower air pressure within the vacuum chamber and will be caused to move along the bottom of the perforated wall 134 by the moving belts 142. When the veneer sheet advances to a position where its forward edge contacts the switch arm 154 the switch 153 will be operated. The arm 154 is placed so that the trailing end of the veneer sheet will be completely clear of the conveyor 6 when the switch arm is contacted. The switch 153 controls a solenoid valve or the like for operating the air cylinder 152 to reverse the positions of the valves 144 and 147 so as to close the vacuum conduits 143 and allow air under atmospheric pressure to enter the vacuum chamber thus releasing the veneer sheet which falls directly to the table 156 thereby forming a stack. As the veneer sheet drops the arm 154 is released and the switch 153 returns the air cylinder to its original position to again apply vacuum pressure to the chamber, ready for reception of the next veneer sheet.

From the foreoing description, it will be appreciated by those skilled in the art that the present system and apparatus provide significant improvements in the formation and handling of wood veneer by the elimination of costly manual handling of rough veneer pieces according to prior art methods. The present system enables a single operator to feed the veneer pieces into the system which automatically joins the pieces, trims them, cut them to size and forms a stack of veneer sheets. The arrangement and types of structural components utilized within this invention may be subject to numerous modifications well within the purview of the invention and applicant intends only to be limited to a liberal interpretation of the specification and appended claims.

Having thus described the invention, what is claimed as new and desired to be secured by Letters Patent is:

1. A continuous system for processing random width veneer pieces to form a composite veneer sheet comprising in combination; an infeed conveyor, tenderizing apparatus including means to inflict a multitude of spaced shallow knife cuts on the top and bottom surfaces of the individual veneer pieces in the direction of the grain thereof and to feed the pieces onto said infeed conveyor with the grain of the pieces running transverse to the direction of travel of the conveyor, a crowder device adapted to receive said pieces from the infeed conveyor, said crowder device including means to move said veneer pieces into tight edge-to-edge abutment over a given portion of travel, each running longitudinally of the abutting edges, joining apparatus associated with said crowder device for directing a plurality of continuous substantially untwisted strands of fibrous material onto the respective top and bottom surfaces of the moving abutted veneer pieces perpendicular to the grain thereof, said strands being coated with a thermoplastic adhesive, said joining apparatus including means to heat the adhesive on each strand to a flowable state prior to its application to the veneer surface, and a plurality of spring biased shoe members, each of said shoe members being associated with a respective strand to apply further heat and pressure to flatten the strand on the veneer surface, each shoe member including a heated toe portion and a hollow heel portion with a cooling medium therein to insure setting of the adhesive.

[2. A continuous system for processing veneer pieces to form a composite veneer sheet comprising in combination; an infeed conveyor, knife means to tenderize each veneer piece and to deliver said pieces to the infeed conveyor, means for receiving said pieces and moving the pieces in abutting relation, and veneer joining apparatus associated with said means for receiving and moving the pieces, said veneer joining apparatus including means to apply a continuous strand of substantially untwisted fibrous material onto the adjacent face surfaces of said pieces parallel with the direction of travel thereof with a thermoplastic adhesive, said adhesive being heated to a flowable state, and pressure shoe means to apply pressure to flatten said strand on the veneer surface, said shoe including a heated toe portion to further heat the adhesive and a heel portion with means to apply a cooling medium to the heel portion to insure setting of said adhesive.]

[3. In combination with means to convey individual veneer pieces in abutting relation, an apparatus for joining said veneer pieces comprising in combination; means to apply a continuous strand of substantially untwisted fibrous material onto the adjacent face surfaces of said pieces parallel with the direction of travel thereof with a thermoplastic adhesive, said adhesive being heated to a flowable state, and pressure shoe means to apply pressure to flatten said strand on the veneer surface, said shoe including a heated toe portion to further heat the adhesive and a heel portion with means to apply a cooling medium to the heel portion to insure setting of said adhesive.]

[4. The combination according to claim 3 wherein said pressure shoe is an elongated member, said toe portion including electrical resistance heating means and said heel portion having a hollow interior with means to circulate a cooling fluid therethrough, and spring biasing means to pressure said shoe agianst the surface of the veneer in contact with the untwisted fibrous strand.]

[5. The combination according to claim 4 wherein said fibrous strand is coated with a thermoplastic adhesive, said veneer joining apparatus includes an elongated guide tube having a curved end portion adjacent the toe portion of the pressure shoe for directing said strand to the surface of the veneer, and electrical resistance heating means for heating said tube to maintain the adhesive on said strand in a flowable state, whereby the strand is flattened and bonded to the veneer surface as it moves beneath said shoe.]

6. The combination according to claim [5] *13* including: means to coat said strand with a thermoplastic adhesive.

7. An apparatus for bonding a continuous strand of substantially untwisted fibrous material to the adjacent face surfaces of a series of moving veneer pieces in edge-to-edge abutment comprising; means to coat said strand with a thermoplastic adhesive, an elongated guide tube for directing said strand to the surface of the veneer, electrical resistance heating means for heating said tube to maintain the adhesive on said strand in a flowable state, an elongated shoe member positioned at the outlet end of said tube, means to bias said shoe against the surface of the veneer, said shoe including a toe portion adjacent the end of said tube with electrical resistance heating means therefor and a heel portion spaced from the toe portion, said heel portion having a hollow interior, and means for circulating a cooling medium through said hollow interior, whereby said strand is flattened and bonded to the veneer surface as it moves beneath said shoe.

8. An apparatus for edge joining wood veneer pieces comprising in combination; means to convey said strips in edge abutting relation, means to direct a continuous strand of substantially untwisted fibrous material onto the adjacent face surfaces of said pieces perpendicular to the direction of the grain therof, said strand being coated with a thermoplastic adhesive, means to heat said adhesive to a flowable state prior to the application of the strand to the veneer surface, and spring biased shoe means to apply further heat and pressure to flatten said strand on the veneer surface, said shoe including a heated toe portion and a hollow heel portion with a cooling medium therein to insure setting of said adhesive.

*9. In combination with means to convey individual veneer pieces in abutting relation, veneer joining apparatus for directing a continuous strand of thermoplastic adhesive coated, fibrous material onto the adjacent face surfaces of said pieces parallel with the direction of travel thereof and applying said strand to said surfaces, said veneer joining apparatus including a pressure shoe assembly having at least one shoe portion thereof heated to insure heating the adhesive to a temperature sufficient to insure bonding of said strand to the veneer surfaces when said strand is flattened onto the veneer surface and cooled and having at least one other shoe portion thereof cooled to insure setting of the adhesive.*

*10. A continuous system for processing veneer pieces to form a composite veneer sheet comprising in combination; an infeed conveyor, knife means to tenderize each veneer piece and to deliver said pieces to the infeed conveyor, means for receiving said pieces and moving the pieces in abutting relation; and veneer joining apparatus associated with said means for receiving and removing the pieces, said veneer joining apparatus including means to direct a continuous strand of thermoplastic adhesive-coated, substantially untwisted fibrous material onto the adjacent face surfaces of said pieces parallel with the direction of travel thereof, pressure and heating means to flatten said strand onto the veneer surfaces and to heat said adhesive to a temperature sufficient to insure bonding of said strand to the veneer surfaces when said strand is flattened onto the veneer surfaces and cooled and means to cool said strand after said strand has been flattened onto the veneer surfaces to insure setting of said adhesive.*

*11. In combination with means to convey individual veneer pieces in abutting relation, an apparatus for joining said veneer pieces comprising in combination; means to direct a continuous strand of thermoplastic adhesive-coated, substantially untwisted fibrous material onto the adjacent face surface of said pieces parallel with the direction of travel thereof, pressure and heating means to flatten said strand onto the veneer surfaces and to heat said adhesive to a temperature sufficient to insure bonding of said strand to the veneer surfaces when said strand is flattened onto the veneer surfaces and cooled, and means to cool said strand after said strand has been flattened onto the veneer surfaces to insure setting of said adhesive.*

*12. The combination according to claim 11 wherein said pressure and heating means includes an elongated pressure shoe member including electrical resistance means in the toe of said shoe member, said cooling means includes a hollow interior chamber located in the heel portion of said shoe member and means to circulate a cooling fluid therethrough, and further including spring biasing means to pressure said shoe member against the surface of the veneer in contact with the untwisted fibrous strand.*

*13. The combination according to claim 12 wherein said means to direct said strand includes an elongated guide tube having a terminal end portion adjacent the toe portion of the pressure shoe member for directing said strand to the surface of the veneer, and electrical resistance heating means for heating said tube to maintain the adhesive on said strand in a flowable state, whereby the strand may be more readily flattened and bonded to the veneer surface as it moves beneath said shoe member.*

*14. In combination with means to convey individual veneer pieces in abutting relation, means for applying a continuous strand of substantially untwisted fibrous material onto the adjacent face surfaces of said pieces parallel with the direction of travel thereof with a thermoplastic adhesive, said strand applying means including a pressure shoe assembly with means for applying pressure to flatten said strand on the veneer surface and to heat said adhesive to a temperature sufficient to insure bonding of said strand to the veneer surfaces when said strand is flattened onto the veneer surfaces and cooled, and means to cool said strand after said strand has been flattened onto the veneer surfaces to insure setting of said adhesive.*

* * * * *